Figure 3:
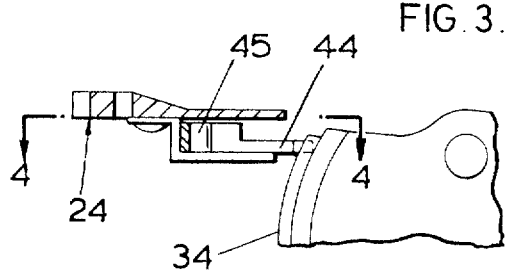

United States Patent
Colley

[11] 3,897,907
[45] Aug. 5, 1975

[54] EXHAUST NOZZLE STRUCTURE

[75] Inventor: Rowan Herbert Colley, Sunnyhill, England

[73] Assignee: Rolls-Royce (1971) Limited, London, England

[22] Filed: Apr. 25, 1974

[21] Appl. No.: 464,236

[30] Foreign Application Priority Data
May 2, 1973 United Kingdom............... 20965/73

[52] U.S. Cl. .......................................... 239/265.39
[51] Int. Cl.[2] ........................................... B64C 15/06
[58] Field of Search ......... 60/232, 271; 239/265.39, 239/265.41, 265.43, 265.17

[56] References Cited
UNITED STATES PATENTS

| | | | |
|---|---|---|---|
| 2,815,643 | 12/1957 | Geary et al. | 239/265.39 |
| 3,441,221 | 4/1969 | Naud et al. | 239/265.39 X |
| 3,454,227 | 7/1969 | Motycka | 239/265.39 |
| 3,705,688 | 12/1972 | Smale | 239/265.39 |

FOREIGN PATENTS OR APPLICATIONS
782,494  6/1954  United Kingdom

Primary Examiner—John J. Love
Attorney, Agent, or Firm—Cushman, Darby & Cushman

[57] ABSTRACT

This invention relates to variable area and variable divergence exhaust nozzles for gas turbine jet propulsion engines and is particularly concerned with providing a means of counter-balancing the gas loads which have to be overcome when operating such nozzles.

In one arrangement of the invention, an exhaust nozzle comprises a plurality of flap assemblies, each assembly being pivoted at its upstream end to the downstream end portion of a jet pipe, each flap assembly and the jet pipe downstream end portion defining in combination a pocket which is arranged to receive a supply of high pressure gas. A region of high pressure is thus created in the pocket which counteracts the radially outward pressure exerted by the normal gas flow through the nozzle.

11 Claims, 5 Drawing Figures

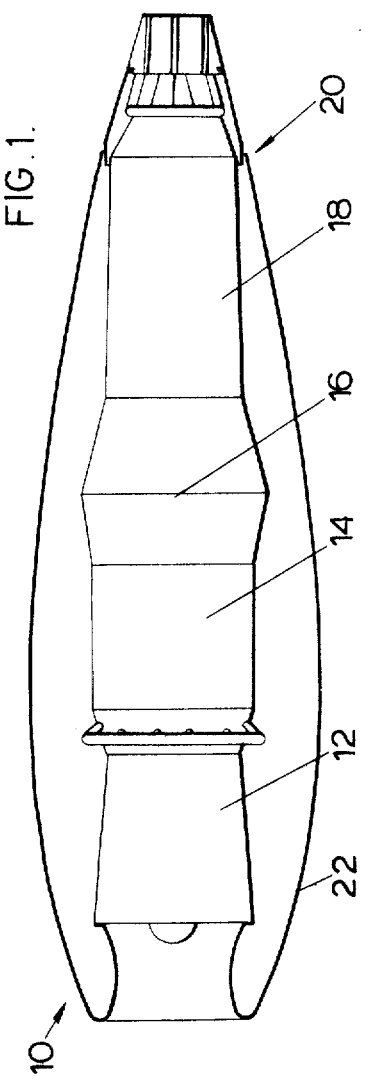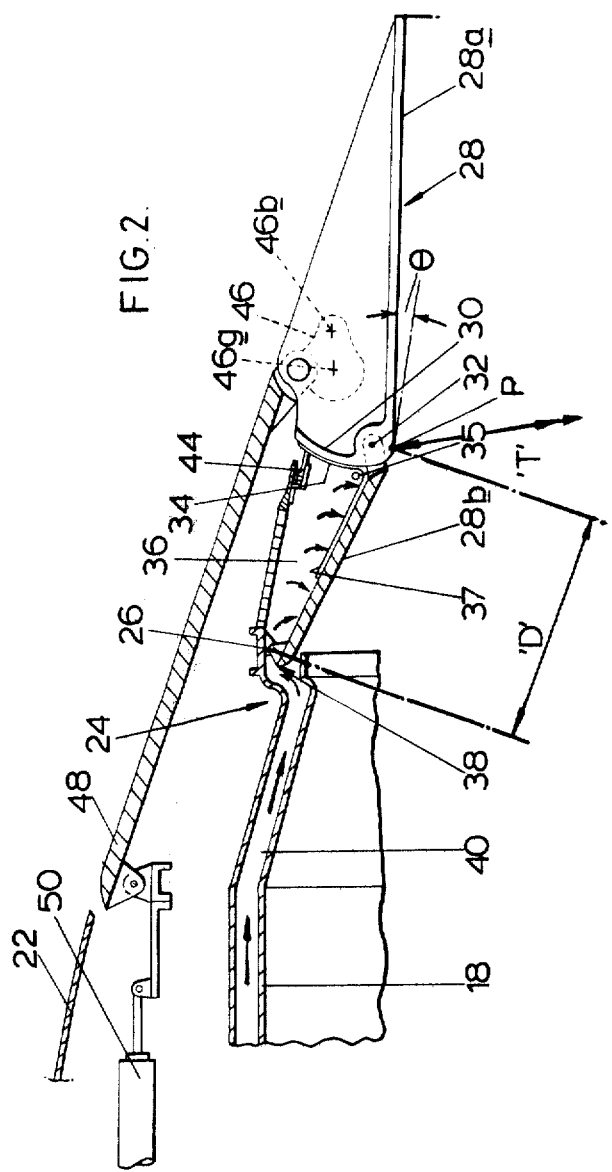

EXHAUST NOZZLE STRUCTURE

This invention concerns exhaust nozzle structures.

Gas turbine jet propulsion engines are sometimes provided with exhaust nozzles which are constructed such that their exit throat area is variable, also the degree of convergence and/or divergence of the path defined by the structure, between the nozzle throat and exit plane is variable so that a given nozzle structure may provide any one of a number of thrust values to suit a number of differing flight conditions experienced by an aircraft which is normally powered by the gas turbine engine.

Such nozzle structures comprise a number of primary flaps arranged circumferentially of a jet pipe end and pivotally connected thereto by their upstream ends (upstream in relation to the flow of gases through an engine to which they are applied) and a number of secondary flaps which are pivotally attached by their upstream ends to the downstream ends of the primary flaps and are made movable therewith, or relative thereto, by actuating apparatus positioned externally of all the flaps so as to move the primary flaps as required, to vary the throat area, or move the secondary flaps so as to vary their degree of divergence.

Varying of throat area is achieved by drawing the primary flaps together in a direction peripherally of the jet pipe so as to reduce the area, or spreading them peripherally of the jet pipe to achieve increase in throat area, the movement being achieved by known powered means.

A considerable difference in the power requirements is experienced with regard to the expanding and contracting of the nozzle, by virtue of the gases exhausting from the jet pipe, on the one hand supplementing the powered means efforts by blowing on to the primary flaps and, on the other hand, acting against the powered means efforts, for the same reason. Thus powered means have to be utilised, the power output of which is sufficient to overcome exhaust gas pressure and those same means are used when no gas pressures have to be overcome. The power output required is such that the equipment which provides it is bulky and heavy, two features which are both undesirable in jet engine design. Consequently it is an object of this invention to provide an exhaust nozzle structure which includes relatively light weight, low powered means for manipulating the primary flaps and primary flap balance means whereby the adverse effect of the exhaust gases on the primary flap throat constricting movement, is reduced such that said lightweight, low powered means may perform said manipulation.

Accordingly the present invention comprises a gas turbine engine jet pipe exhaust nozzle structure including at least a set of throat defining flaps, and a jet pipe downstream end portion, wherein the upstream end of each flap is pivotally connected to the inner surface of said jet pipe downstream end portion such that an upstream portion of each said flaps defines therewith a pocket, the interior of which in operation is in communication with a pressurised gas supply which fills each said pocket and urges each said flap radially inwardly of the jet pipe downstream end portion.

Figure 4:
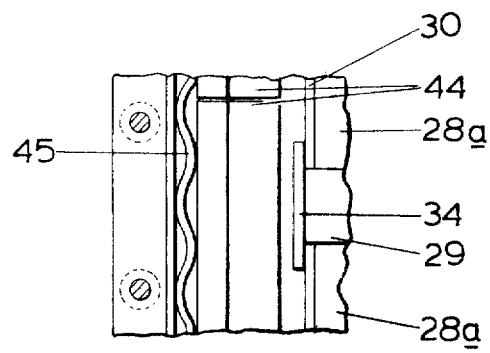
Figure 5:
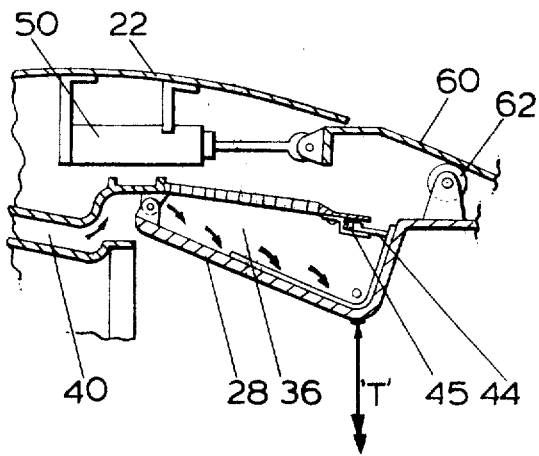

The invention will now be described, by way of example only and with reference to the accompanying drawings in which:

FIG. 1 is a diagrammatic view of a gas turbine engine having an exhaust nozzle structure in accordance with the invention, FIG. 2 is an enlarged part sectional view of the gas turbine engine exhaust nozzle of FIG. 1, FIG. 3 is an enlarged part view of FIG. 2, FIG. 4 is a view on line 4—4 of FIG. 3, and FIG. 5 is a part sectional view of a further embodiment in accordance with the invention.

In FIG. 1 a gas turbine engine 10, comprises compressor 12, combustion equipment 14, expansion turbine 16 and jet pipe 18, the downstream end of which includes an exhaust nozzle structure 20, the engine 10 being enclosed in a streamlined cowl 22.

As is more clearly seen in FIG. 2 the exhaust nozzle structure 20 comprises the downstream end portion 24 of the jet pipe 18 and the portion 24 pivotally supports from its inner surface at 26, the upstream ends of a set of throat defining flap assemblies 28, the throat defined thereby being in the plane 'T'.

Each throat defining flap assembly 28 comprises a secondary flap 28a having a transverse wall 30, articulately joined at 32 to a primary flap 28b.

Each flap assembly 28 overlaps a slave flap 29 (FIG. 4) in known manner in a direction peripherally of the downstream end portion 24 so that, no matter what position the set of flap assemblies 28 adopts, the slave flaps ensure continuity of nozzle wall structures and prevent exhaust gases from leaking between the flaps.

The jet pipe downstream end portion 24 fully overlaps all of the primary flaps 28b so that end portion 24, flaps 28b and transverse walls 30 of the secondary flaps 28a together form an annular pocket 36 which is open at its upstream end 38, the opening being aligned with the outlet of an annular jet pipe gas flow passage 40.

Sealing at the downstream end of pocket 36 is achieved by plates 34 hinged at 35 which overlap peripherally adjacent walls 30, and a segmented annular seal 44 which is more clearly seen in FIG. 3. Seal 44 comprises a number of arcuate strips arranged around the downstream periphery of nozzle portion 24 and having their upstream ends abutting an annular spring washer 45 (FIG. 4) so as to be axially movable as walls 30 press against them during relative movement between flap 28a and flap 28b which movement 'akes place about pivot joint 32 when the throat ɛ ɟa is changed, or about joint 26 when each flap assem ᵤly 28 as a whole moves relative to the jet pipe. The segmentation permits differential expansion between nozzle 24 and the seal 44. Sealing of the circumferential walls of the each pocket 36, the walls being defined by adjacent primary flaps 28b is provided by plates 37 which are also hinged at 35.

Throat area variation is obtained by actuation of a re-circulating ball screw apparatus 46 which is connected to the flap assemblies 28 in the manner shown or described for example in British patent specification No. 782,494 said actuation causing the flap assemblies 28 to be drawn together or moved apart so as to respectively decrease or increase the throat area of the nozzle in known manner. For example, a gear box having a centre-line indicated at 46b and driven by an air motor via a flexible drive may be mounted on each alternate flap assembly 28, each of said gear boxes being arranged to drive two tangential gear boxes. Each tangential gear box is arranged to actuate a circumferential ball-screw mechanism, the centre-line of one of which is indicated at 46a. Each ball-screw mechanism is connected between a tangential gear box and one of the flap assemblies 28 which does not have a gear box. It will thus be understood that there are two sets of flap assemblies, circumferentially inter-spaced with one another, each one of the flap assemblies of one said sets carrying a gear box and two tangential gear boxes, whilst each one of the flap assemblies of the other are connected by two ball-screw arrangements to adjacent ones of the flap assemblies of the first set.

When it is desired to increase the nozzle outlet throat area, the recirculating ball and screw apparatus 46 is actuated to spread flap assemblies 28 relative to each other, thus causing them to pivot radially outwards of the engine axis, about the axes of pivoted supports 26. A decrease in throat area is obtained by actuating apparatus 46 so as to draw flap assemblies 28 to their fully overlapping positions, which causes them to pivot radially inwards about the axes of pivotal supports 26.

Change in the rate of divergence of flaps 28a is achieved by the translation of a set of external flaps 48, in a direction axially of the engine. In the present example translation is brought about by the actuation of rams 50 and causes flaps 28a to pivot about the axis of pivot joint 32, thus varying the angle defined by flap 28a and a line parallel with the engine axis and passing through point 'P' on the throat line.

During all the time engine 10 is operating, jet pipe exhaust gas loads are acting on the inner surface of flap assemblies 28, in a direction radially outwardly of the engine axis and the maximum gas load is experienced by the upstream ends of primary flaps 28b. This is because as the gas converges towards throat 'T', it accelerates, thus reducing pressure to a value less than that at the upstream ends of flaps 28b. Heretofor, ball and screw mechanism 46 or other mechanical devices as described later in this specification, has been the only means by which the gas loads on the flaps have been overcome when throat area is reduced. However, in the present arrangement, the high pressure gas (that is, high relative to atmospheric pressure) which has passed from passage 40 into pocket 36, acts on the upper surface of each flap 28b in a direction counter to that of the loads exerted by gas from the jet pipe and acts as a moment arm which is effective over distance 'D' (FIG. 2) the effect being amplified at the downstream ends of flaps 28b by virtue of the reduced gas pressure on the other side of the flap at that end. Thus the system provides a large mechanical advantage and positive assistance to apparatus 46 as it acts to move the flaps radially inwards to reduce throat area.

FIG. 5 illustrates a further embodiment of the invention in which like parts have been given like numerals. In this embodiment, the flap assemblies 28 each comprise a one piece member with its downstream end bent outwardly to form the downstream wall of pocket 36. The set of flaps is moved inwardly to reduce the throat area 'T' by a translatable frusto-conical ring 60 which acts upon the flaps via rollers 62. Pocket 36 is filled with gas from passage 40, thus providing those advantages described in connection with the embodiment of the present invention described with reference to FIGS. 1 to 4 inclusive.

I claim:

1. A gas turbine engine jet pipe exhaust nozzle structure comprising:

at least a set of movable throat defining flaps and a jet pipe downstream end portion having an inner surface and a terminal edge, each of said flaps of said set having an upstream portion extending into and pivotally connected at its upstream end to the inner surface of said jet pipe downstream end portion at a position upstream of its terminal edge and a downstream portion extending out of and downstream of said jet pipe downstream end portion;

sealing means between said jet pipe downstream end portion at or adjacent its terminal end and each of said flaps, said upstream portion of said flaps and said jet pipe downstream end portion defining a pocket;

and means for supplying a pressurized gas to said pocket which acts on the upstream portion of each of said flaps to counteract radially outward pressure exerted on each of said flaps by normal gas flow through the nozzle structure.

2. A nozzle structure as claimed in claim 1 including sealing means between adjacent flaps of said set, said sealing means including a plurality of hinged plates overlapping any space between adjacent flaps.

3. A nozzle structure as claimed in claim 1 in which said sealing means between the jet pipe downstream end portion and each of said flaps includes a segmented ring mounted on the jet pipe downstream end portion and urged into contact with each of said flaps, each segment of said ring overlapping any space between adjacent flaps.

4. A nozzle structure as claimed in claim 3 in which said sealing means between the jet pipe downstream end portion and each of said flaps further includes a transverse wall on each of said flaps which sealingly cooperates with said jet pipe downstream end portion.

5. A nozzle structure as claimed in claim 1 in which said sealing means between the jet pipe downstream end portion and each of said flaps includes a transverse wall on each of said flaps which sealingly cooperates with said jet pipe downstream end portion.

6. A nozzle structure as claimed in claim 1 in which each of said flaps of said set comprises a primary flap member and a secondary flap member, the primary and secondary flap members being pivotally joined together with the upstream end of the primary flap member being pivotally secured to the jet pipe downstream end portion.

7. A nozzle structure as claimed in claim 6 in which said sealing means includes a transverse wall on each of said secondary flap members which sealingly cooperates with said jet pipe downstream end portion.

8. A nozzle structure as claimed in claim 6 in which each of said secondary flap members has a slave flap which overlaps any space between adjacent flaps.

9. A nozzle structure as claimed in claim 6 including an actuating mechanism comprising a plurality of external flap members pivotally connected to said secondary flap members, each external flap member being axially moveable to cause each of said secondary flap members to pivot with respect to its respective primary flap member and thereby vary the divergence of the secondary flap member.

10. A nozzle structure as claimed in claim 9 including circumferentially arranged actuating means operatively connected to said set of flaps to vary the circumferential distance between adjacent flaps of the set and thereby cause the primary and secondary flap members to pivot with respect to the jet pipe downstream end portion so that the throat area of the nozzle is varied.

11. A nozzle structure as claimed in claim 1 in which each of said flaps is a one-piece member and including means to actuate the same, said last-mentioned means comprising an axially movable ring, a roller mounted on each of said flaps and engaging said ring.

* * * * *